(12) United States Patent
Isoda et al.

(10) Patent No.: US 6,610,787 B2
(45) Date of Patent: Aug. 26, 2003

(54) THERMOPLASTIC RESIN COMPOSITION

(75) Inventors: Shinji Isoda, Tokyo (JP); Narito Ishiga, Tokyo (JP); Hironari Muraki, Tokyo (JP); Yuuji Nakagawa, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 10/170,197

(22) Filed: Jun. 13, 2002

(65) Prior Publication Data

US 2003/0022995 A1 Jan. 30, 2003

(30) Foreign Application Priority Data

Jun. 14, 2001 (JP) ......................................... 2001-180640

(51) Int. Cl.$^7$ ............................................... C08L 23/00
(52) U.S. Cl. ................... 525/240; 525/243; 525/293; 525/316; 525/328.3; 525/329.1; 525/331.7; 525/331.9; 526/333.3; 526/326.1
(58) Field of Search ................................. 525/240, 243, 525/293, 316, 328, 3, 329.1, 331.7, 331.9, 333.3, 326.1

(56) References Cited

U.S. PATENT DOCUMENTS 4,960,823 A * 10/1990 Komatsu et al. ............... 525/89
6,492,467 B1 * 12/2002 Kim et al. ................... 525/316

* cited by examiner

*Primary Examiner*—David W. Wu
*Assistant Examiner*—William Cheung
(74) *Attorney, Agent, or Firm*—Nixon & Vanderhye

(57) ABSTRACT

The present invention relates to a thermoplastic resin composition comprising a rubber-reinforced thermoplastic resin as component (A) and an ethylene-α-olefin copolymer having a Mooney viscosity (ML1+4, 100° C.) of 40 to 110 as component (B), the amount of component (B) being 1 to 70 parts by weight based on 100 parts by weight of component (A).

6 Claims, No Drawings

THERMOPLASTIC RESIN COMPOSITION

BACKGROUND OF THE INVENTION

The present invention relates to a thermoplastic resin composition, particularly one having excellent moldability and capable of providing molded products with high mechanical strength and excellent matte surface appearance. The thermoplastic resin composition according to the present invention is suited for use as a molding material for the sheet-like products with a matte surface.

Rubber-reinforced thermoplastic resins are popularly used for various purposes because of high impact resistance, good moldability and surface gloss of their molded products. In some uses, however, there are required the molded products having their surfaces matte-finished without affecting the other properties of the products.

As conventional means for matting the surface of the molded products, a method is known in which an oxide or carbonate of titanium, magnesium, calcium or the like is added to a rubber-reinforced thermoplastic resin (Japanese Patent Publication (KOKOKU) No. 63-67818). This method, however, has the disadvantage of greatly impairing the mechanical properties, especially mechanical strength, of the resin, and is also incapable of effecting always uniform matting of the molded article surface.

It is also well known to add a rubber-like polymer to a rubber-reinforced thermoplastic resin for matting the molded article surface. This method has the problem that the addition of a rubber-like polymer can adversely affect the mechanical properties of the resin, especially its hardness or rigidity, and is also liable to produce a foreign matter on the molded article surface to greatly detract the commercial value of the molded article.

There is further known a method comprising the addition of a resin material whose molecular structure has been three-dimensioned by a crosslinkable monomer (Japanese Patent Publication (KOKOKU) No. 3-59939), but this method has the disadvantages of causing non-uniform matting of the molded article surface and deteriorating moldability.

SUMMARY OF THE INVENTION

An object of the present invention is to provide a thermoplastic resin composition having excellent moldability and capable of providing the molded products with high mechanical strength and excellent matte surface appearance.

To attain the above aim, in the first aspect of the present invention, there is provided a thermoplastic resin composition comprising a rubber-reinforced thermoplastic resin as component (A) and an ethylene-α-olefin copolymer having a Mooney viscosity (ML1+4, 100° C.) of 40 to 110 as component (B), the amount of component (B) being 1 to 70 parts by weight based on 100 parts by weight of component (A).

In the second aspect of the present invention, there is provided a thermoplastic resin composition comprising a rubber-reinforced thermoplastic resin as component (A) and an ethylene-α-olefin copolymer having a Mooney viscosity (ML1+4, 100° C.) of 40 to 110 as component (B), the amount of component (B) being 1 to 70 parts by weight based on 100 parts by weight of component (A), said component (A) comprising:
100 parts by weight of a rubber-reinforced thermoplastic resin (A1) obtained by polymerizing 5 to 94% by weight of an aromatic vinyl compound, 1 to 90% by weight of a vinyl cyanide compound and 0 to 89% by weight of other copolymerizable compound (the total of the ratios of the respective components being 100% by weight) in the presence of 5 to 80% by weight of a rubber-like polymer (i) which is an ethylene-α-olefin-(nonconjugated diene) copolymer, and 1 to 70 parts by weight of a rubber-reinforced thermoplastic resin (A2) obtained by polymerizing 5 to 94% by weight of an aromatic vinyl compound, 1 to 90% by weight of a vinyl cyanide compound and 0 to 89% by weight of other copolymerizable compound (the total of the ratios of the respective components being 100% by weight) in the presence of 5 to 80% by weight of a rubber-like polymer (ii), which rubber-like polymer (ii) is a hydrogenated block copolymer obtained by hydrogenating a block copolymer comprising an aromatic vinyl compound unit and a conjugated diene compound unit, the number-average molecular weight (Mn) of the block copolymer being 5,000 to 1,000,000, the ratio of weight-average molecular weight (Mw) to number-average molecular weight (Mn), Mw/Mn, being not more than 10, the vinyl bond content of the diene moiety being 10 to 90%, and the hydrogenation rate of the olefinic unsaturated bond is not less than 70%.

DETAILED DESCRIPTION OF THE INVENTION

The present invention is described in detail below. The thermoplastic resin composition according to the present invention comprises a rubber-reinforced thermoplastic resin as component (A) and an ethylene-α-olefin copolymer having a Mooney viscosity (ML1+4, 100° C.) of 40 to 110 as component (B).

<Component (A)>

Component (A) is not specifically defined in the present invention, but there are preferably used rubber-reinforced thermoplastic resins which are obtained by polymerizing aromatic vinyl compounds, vinyl cyanide compounds and other copolymerizable compounds in the presence of a rubber-like polymer. Mixtures of these rubber-reinforced thermoplastic resins and (co)polymers of the said monomers are also usable preferably. Actual examples of these components are explained below successively. Rubber-like polymers will be described later for the convenience of explanation.

Examples of the said aromatic vinyl compounds include styrene, α-methylstyrene, p-methylstyrene and bromostyrene. These compounds may be used alone or as a combination of two or more. Among these compounds, styrene and α-methylstyrene are preferred.

Examples of the said vinyl cyanide compounds include acrylonitrile and methacrylonitrile. These compounds may be used alone or as a combination of two or more. Acrylonitrile is preferred.

Examples of the said other copolymerizable compounds include (meth)acrylic ester compounds such as methyl methacrylate and methyl acrylate, maleimide compounds such as N-phenylmaleimide and N-cyclohexylmaleide, and compounds of unsaturated carboxylic acids such as acrylic acid, methacrylic acid, itaconic acid and fumaric acid. These compounds may be used alone or as a combination of two or more.

Here, the said rubber-like polymers are explained. The rubber-like polymers used in the present invention are not specifically defined, and it is possible to use both diene type and non-diene type rubber-like polymers.

Examples of the diene type rubber-like polymers include natural rubber, polyisoprene, polybutadiene, styrene-butadiene copolymer, butadiene-acrylonitrile copolymer, isobutyrene-isoprene copolymer, and aromatic vinyl monomer-conjugated diene block copolymers (such as styrene-butadiene block copolymer, styrene-isoprene-styrene block copolymer and styrene-butadiene-styrene block copolymer).

Examples of the non-diene type rubber-like polymers include hydrogenated conjugated diene (co)polymer, ethylene-α-olefin-(nonconjugated diene) copolymers (such as ethylene-propylene-(nonconjugated diene) copolymer and ethylene-butene-(nonconjugated diene) copolymer), acrylic rubber, polyurethane rubber and silicone rubber. Parenthesizing of nonconjugated diene is intended to indicate that the nonconjugated diene is an optional component.

In view of weather resistance of the produced thermoplastic resin composition, preferably a nonconjugated diene type rubber-like polymer, more preferably an ethylene-α-olefin-(nonconjugated diene) copolymer, acrylic rubber or a hydrogenated conjugated diene (co)polymer is used. Use of an ethylene-α-olefin-(nonconjugated diene) copolymer is especially preferred.

As ethylene-α-olefin-(nonconjugated diene) copolymers (which may hereinafter be referred to as "rubber-like polymers (i)", there can be exemplified, ethylene-α-olefin rubbers such as ethylene-α-olefin random copolymer rubber and ethylene-α-olefin-nonconjugated diene random copolymer rubber.

Examples of the said rubber-like polymers (i) are the copolymer rubbers obtained by copolymerizing the monomers comprising a mixture of ethylene/$C_3$–$C_{20}$ α-olefin/nonconjugated diene 5 to 95/95 to 5/0 to 30 (the total being 100% by weight). The carbon number of the α-olefin is preferably 3 to 12, more preferably 3 to 8. A too much carbon number may be detrimental to copolymerizability.

Exemplary of $C_3$–$C_{20}$ α-olefins are propylene, 1-butene, 1-pentene, 1-hexene, 4-methyl-1-pentene, 1-heptene, 1-octene, 1-decene and 1-dodecene. Propylene, 1-butene and 1-octene are preferred, especially propylene and 1-butene are preferred. These α-olefins may be used singly or as a combination of two or more. The ethylene to α-olefin weight ratio (ethylene/α-olefin) is usually 5 to 95/95 to 5, preferably 50 to 90/50 to 10, more preferably 40 to 85/60 to 15.

Examples of the conjugated diene compounds include alkenyl norvornenes, cyclic dienes and aliphatic dienes. Specifically, dicyclopentadiene and 5-ethylidene-2-norvornene are preferred. These nonconjugated diene compounds may be used singly or as a combination of two or more. The content of conjugated diene monomer units in ethylene-α-olefin rubbers is usually 0 to 30% by weight, preferably 0 to 15% by weight, based on the whole composition.

Catalysts of both homogeneous and heterogeneous systems can be used for the preparation of rubber-like polymers (i). Metallocene catalysts are typical examples of the catalysts of homogeneous system, and vanadium-based catalysts comprising a combination of vanadium compounds and organic aluminum compounds are typical examples of the catalysts of heterogeneous system.

Preferably, there exists substantially no double-bond in the backbone of the said rubber-like polymers (i). This means that double-bond is not allowed to exist in the backbone in any more amount than liable to impair weather resistance of the composition. The upper limit of the amount of double-bonds allowed to exist varies depending on the type of the rubber-like polymer used and can not be decided unequivocally, but it can be decided by conducting proper experiments for the respective types of rubber-like polymer. The degree of unsaturation preferably falls in the range of 0 to 40 in terms of iodine value. A too high degree of unsaturation may be liable to cause deterioration of weather resistance, light resistance and hue. Mooney viscosity (ML1+4, 100° C.) is usually not more than 60, preferably not more than 50, more preferably 20 to 40. When Mooney viscosity exceeds 60, the molded product of the obtained thermoplastic resin composition tends to deteriorate in appearance. Glass transition temperature of rubber-like polymer (i) is usually −110 to −40%, preferably −70 to −45° C. When the glass transition temperature of rubber-like polymer (i) exceeds −40%, the produced thermoplastic resin composition tends to prove unsatisfactory in impact resistance.

In the present invention, in case of using as component (A) a rubber-reinforced thermoplastic resin (which may hereinafter be abbreviated as component (A1)) obtained by polymerizing an aromatic vinyl compound, a vinyl cyanide compound or other copolymerizable compound in the presence of the said rubber-like polymer (i), it is preferable to use, in combination of component (A1), a rubber-reinforced thermoplastic resin (which may hereinafter be abbreviated as component (A2)) obtained by polymerizing an aromatic vinyl compound, a vinyl cyanide compound or other copolymerizable compound in the presence of a rubber-like polymer (ii) explained below. Use of component (A2) conduces to further improvement of impact strength of the produced thermoplastic resin composition.

The rubber-like polymer (ii) used for the preparation of component (A2) is a hydrogenated block copolymer that can be obtained by hydrogenating a block copolymer comprising an aromatic vinyl compound unit and a conjugated diene compound unit. Number-average molecular weight (Mn) of the said block copolymer is usually 5,000 to 1,000,000, the ratio of weight-average molecular weight (Mw) to number-average molecular (Mn), Mw/Mn, is usually not more than 10, the content of vinyl bonds in the diene moiety is usually 10 to 90%, and the hydrogenation rate of olefinic unsaturated bond is usually not less than 70%.

Examples of the said aromatic vinyl compound include styrene, α-methylstyrene and vinyltoluene, styrene being preferred. Preferred examples of the conjugated diene compound include butadiene, isoprene and a combination thereof. The ratio of the aromatic vinyl compound to the conjugated diene compound is not specifically defined, but in order to elevate impact strength of the rubber-reinforced thermoplastic resin (component (A2)), it is selected such that the weight ratio of rubber-reinforced thermoplastic resin/conjugated diene compound will become usually 5 to 60/40 to 95, preferably 10 to 50/50 to 90.

The molecular structure of the said block copolymer comprising an aromatic vinyl compound unit and a conjugated diene compound unit may be linear, branched, radial or a combination thereof. The block structure may be diblock, triblock or multiblock. The triblock structure may be unsymmetrical about the center.

The said block copolymer can be obtained, for example, by conducting anionic living polymerization in the presence of an organolithium initiator in a hydrocarbon solvent. The branched polymer can be obtained by adding a necessary amount of a tri- or higher functional coupling agent on the conclusion of the above-said polymerization.

As the organolithium initiator, n-butyl lithium, sec-butyl lithium, tert-butyl lithium and the like can be used. As the hydrocarbon solvent, hexane, heptane, methylcyclopentane, cyclohexane, benzene, toluene, xylene, 2-methylbutene-1, 2-methylbutene-2 and the like can be used.

The coupling agent used in the above reaction is selected from the tri- or higher functional coupling agents, the examples thereof including tetrachlorosilicon, butyltrichlorosilicon, tetrachlorotin, butyltrichlorotin, tetrachlorogermanium, bis(trichlorosilyl), ethane, divinylbenzene, adipic diester, epoxidized liquid polybutadiene, epoxidized soybean oil, epoxidized linseed oil, tolylene diisocyanate, diphenylmethane diisocyanate, and 1,2,4-benzene triisocyanate.

The polymerization operation may be either batchwise or continuous. Polymerization temperature is usually 0 to 120° C., and polymerization time is usually 10 minutes to 3 hours.

Number-average molecular weight (Mn) of the said block copolymer is usually 5,000 to 1,000,000, preferably 30,000 to 800,000, more preferably 50,000 to 600,000. This number-average molecular weight can be controlled with the polymerization catalyst. When the number-average molecular weight of the said copolymer is less than 5,000, the produced thermoplastic resin composition may be low in impact strength, and when it exceeds 1,000,000, the produced composition may have poor moldability In the ratio of weight-average molecular weight (Mw) to number-average molecular weight (Mn) of the block copolymer, Mw/Mn, is usually not more than 10, preferably not more than 8, more preferably not more than 5, especially preferably 1 to 3. When Mw/Mn is more than 10, the particle size distribution of the graft rubber particles produced during polymerization may be spread to impair appearance of the product. Mw/Mn can be controlled by the selection of the type of polymerization catalyst used. The said weight-average molecular weight (Mw) and number-average molecular weight (Mn) are usually determined by gel permeation chromatography (GPC).

The content of vinyl bonds in the diene moiety of the said block copolymer is usually 10 to 90%, preferably 20 to 80%, more preferably 25 to 75%, even more preferably 30 to 60%. When the vinyl bond content is less than 10% or exceeds 90%, the obtained thermoplastic resin composition may be low in impact resistance at low temperatures. Ethers, tertiary amine compounds, and alkoxides, phenoxides or sulfonates of alkaline metals such as sodium or potassium are used in the production for the control of content of vinyl bonds such as 1,2-bond and 3,4-bond.

Hydrogenation of the said block copolymer is conducted by dissolving the block copolymer in a hydrocarbon solvent and carrying out hydrogenation reaction in the presence of a hydrogenation catalyst at 20 to 150° C. under pressurized hydrogen of 1 to 100 Kg/cm$^2$. As the hydrogenation catalyst, there can be used, for example, the catalysts comprising noble metals (palladium, ruthenium, rhodium, platinum, etc.) supported on carriers (silica, carbon, diatomaceous earth, etc.), complex catalysts such as rhodium, ruthenium, platinum, etc., catalysts comprising organic carboxylic acids and organic aluminum or organic lithium, such as cobalt and nickel, and hydrogenation catalysts comprising titanium compounds (dicyclopentadienyltitanium dichloride, dicyclopentadienyldiphenyltitanium, dicyclopentadienylti-tanium ditolyl, dicyclopentadienyltitanium dibenzyl, etc.) and organometallic compounds (lithium, aluminum, magnesium, etc.). The hydrogenation rate of olefinic unsaturated bonds in the block copolymer is usually not less than 70%, preferably not less than 80% for elevating weather resistance of the produced thermoplastic composition.

Component (A) used in the present invention can be obtained by polymerizing an aromatic vinyl compound, a vinyl cyanide compound and other copolymerizable compound in the presence of a rubber-like polymer such as mentioned above.

The ratios of the respective components are as follows. Rubber-like polymer is usually 5 to 80% by weight, preferably 5 to 60% by weight, aromatic vinyl compound is usually 5 to 94% by weight, preferably 10 to 70% by weight, vinyl cyanide compound is usually 1 to 90% by weight, preferably 5 to 65% by weight, and other copolymerizable compound is usually 0 to 89% by weight, preferably 5 to 65% by weight (the total of the ratios of the respective components being 100% by weight). The aromatic vinyl compound/vinyl cyanide compound ratio (by weight) is usually 30 to 98/2 to 70, preferably 60 to 95/5 to 40. Component (A) used in the present invention may be a mixture of a (co)polymer of a monomer such as mentioned above and a rubber-reinforced thermoplastic resin as far as the ratios of the respective components fall within the above-defined ranges.

When the ratio of the rubber-like polymer is less than 5% by weight, the obtained thermoplastic resin composition tends to prove unsatisfactory in impact resistance because of low rubber content. When the polymer ratio exceeds 80% by weight, the obtained composition also tends to deteriorate in impact resistance because of low graft ratio after the polymerization. Graft ratio will be discussed later. When the ratio of the aromatic vinyl compound is less than 5% by weight, moldability of the obtained thermoplastic resin composition tends to deteriorate, and when the compound ratio exceeds 94% by weight, there may be seen a worsening tendency in colorability of the molded product, appearance of the welded portion, chemical resistance and weather resistance. When the ratio of the vinyl cyanide compound is less than 1% by weight, chemical resistance and rigidity of the molded product tend to lower, and when this ratio exceeds 90% by weight, color tone and moldability of the obtained thermoplastic resin composition tend to deteriorate.

Component (A) can be produced by a known polymerization method such as emulsion polymerization, suspension polymerization, solution polymerization and bulk polymerization. When the rubber-like polymer is produced as a latex by emulsion polymerization, component (A) is usually produced by emulsion polymerization. On the other hand, when the rubber-like polymer is produced as a solution or solid by solution polymerization, component (A) is produced by solution polymerization or bulk polymerization. A known polymerization initiator and a known chain transfer agent (molecular weight modifier) are used in the production of component (A). When emulsion polymerization is carried out, an emulsifier and water are also used.

In the preparation of component (A), the materials (monomers) may be polymerized by adding all together in the presence of the whole amount of a rubber-like polymer, or they may be added in portions or continuously. Or they may be polymerized by combining these methods. Further, the whole amount or part of the rubber-like polymer may be added in the course of polymerization. In case of using a solid rubber-like polymer, it may be dissolved in part or whole of the monomer and/or polymerization solvent and then offered to polymerization.

The graft ratio of component (A) is usually 10 to 150%, preferably 35 to 80%. The graft ratio shown here is a value determined by the method shown in the Examples. This graft ratio can be controlled by the amount of polymerization initiator, polymerization temperature and other factors.

When the graft ratio is below 10%, the obtained thermoplastic resin composition may be intolerably poor in solvent resistance such as resistance to kerosine and resistance to gasoline and may be worsened in colorability of the molded product and appearance of the welded portion. On the other hand, when the graft ratio exceeds 150%, the produced thermoplastic resin composition may be unsatisfactory in impact resistance and moldability.

Intrinsic viscosity [η] of the acetone soluble matter (measured in methylethyl ketone at 30° C.) varies depending on the type of component (A) used. In the case of component (A1) and component (A2) in combination, using a rubber-like polymer (i), the said intrinsic viscosity is usually 0.1 to 1 dl/g, preferably 0.2 to 0.7 dl/g. In the case of component (A2) using a rubber-like polymer (ii), the said intrinsic viscosity is usually not less than 0.15 dl/g, preferably 0.18 to 1.5 dl/g, more preferably 0.18 to 1.2 dl/g.

<Component (B)>

Component (B) comprises an ethylene-α-olefin copolymer having a Mooney viscosity (ML1+4, 100° C.) of 40 to 110.

Such ethylene-α-olefin copolymers include bicopolymers of ethylene and α-olefins, tercopolymers of ethylene, α-olefins and nonconjugated dienes, and mixtures thereof.

The carbon number of the said α-olefins is usually 3 to 20, preferably 3 to 12. When the carbon number exceeds 20, copolymerizability of the composition may be poor. Examples of the said u-olefins are propylene, 1-butene, 1-pentene, 1-hexene, 4-methyl-1-pentene, 1-heptene, 1-octene, 1-decene, 1-dodecene, 1-hexadecene and 1-eicosene. Of these α-olefins, propylene is preferred. These α-olefins may be used singly or as a combination of two or more.

The nonconjugated dienes usable for the said tercopolymers are not specifically defined; it is possible to use, for instance, cyclic dienes such as cyclohexadiene, dicyclopentadiene, methyltetrahydroindene, 5-vinyl norbornene, 5-ethylidene-2-norbornene, 5-methylene-2-norbornene, 5-isopropylidene-2-norbornene, and 6-chloromethyl-5-isopropenyl-2-norbornene, and aliphatic dienes such as 1,4-hexadiene, 1,6-octadiene, 2-methyl-1,5-hexadiene, 6-methyl-1,5-heptadiene, and 7-methyl-1,6-octadiene. Of these nonconjugated dienes, dicyclopentadiene and 5-ethylidene-2-norbornene are preferred. Also, these nonconjugated dienes may be used singly or as a combination of two or more.

The content of α-olefin units in component (B) is usually 10 to 70% by weight, preferably 15 to 60% by weight, more preferably 20 to 55% by weight, and the content of ethylene units is usually 30 to 90% by weight, preferably 40 to 85% by weight, more preferably 45 to 80% by weight. A too low content of α-olefin units tends to deteriorate impact resistance of the produced thermoplastic resin composition, while a too high content of α-olefin units tends to lower weather resistance of the composition.

When component (B) is an ethylene-α-olefin-nonconjugated diene tercopolymer, the content of nonconjugated diene units is associated with gelation of the ethylene-α-olefin copolymer and thus has a tendency to exert influence on the properties of the produced composition. In view of this, the content of nonconjugated diene units is usually defined to be not more than 20% by weight, preferably not more than 18% by weight, more preferably not more than 15% by weight.

Mooney viscosity (ML1+4, 100° C.) of component (B) is 40 to 110, preferably 45 to 80, more preferably 50 to 80. When the said Mooney viscosity is too low, the molded product of the obtained thermoplastic resin composition may be poor in impact resistance and matte effect. When the said Mooney viscosity is too high, nonuniform matting tends to take place, it may be difficult to obtain a uniform matte surface.

Glass transition temperature (Tg) of component (B) is usually −110 to 20%, preferably −85 to −20° C., more preferably −70 to −30° C. When the Tg is too low, the produced composition may be degraded in moldability and mechanical strength, and when the Tg is too high, mechanical strength at low temperatures may be reduced.

Component (B) can be produced by using either a Ziegler type catalyst or a methalocene type catalyst.

In the thermoplastic resin composition of the present invention comprising the said component (A) and the said component (B), the amount of component (B) is 1 to 70 parts by weight, preferably 5 to 65 parts by weight, more preferably 5 to 50 parts by weight based on 100 parts by weight of component (A). When the content of component (B) is too low, no satisfactory matting can be effected, and when the content of component (B) is too high, mechanical strength of the composition may be reduced, giving rise to the unfavorable phenomena such as separation.

When the said components (A1) and (A2) are used together, the amount of component (A2) is 1 to 70 parts by weight, preferably 5 to 65 parts by weight, more preferably 5 to 50 parts by weight based on 100 parts by weight of component (A1). When the content of component (A2) is too low, the impact resistance improving effect may be unsatisfactory, and when the (A2) content is too high, the desired matte effect may not be obtained.

Weight-average molecular weight (Mw) of the tetrahydrofuran (THF) soluble matter of the thermoplastic resin composition according to the present invention is usually not less than 100,000, preferably 100,000 to 350,000, more preferably 100,000 to 330,000. When the said weight-average molecular weight (Mw) is too small, impact resistance and matte effect of the molded product of the obtained thermoplastic resin composition may be unsatisfactory, and when Mw is too large, nonuniform matting tends to occur, it may be difficult to obtain a uniform matte surface.

The ratio of weight-average molecular weight (Mw) to number-average molecular weight (Mn) of the said soluble matter, Mw/Mn, is usually not less than 2.5, preferably 2.6 to 5, more preferably 2.8 to 5. When the Mw/Mn ratio is too small, matting may be unsatisfactory, and when the Mw/Mn ratio is too large, impact resistance may lower.

The thermoplastic resin composition according to the present invention may contain, if necessary, known additives such as, for example, flame retardant, antibacterial agent, mildew proofing agent, ultraviolet absorber, antioxidant, weather (light) resisting agent, plasticizer, colorant (pigment, dye, etc.), antistatic agent, etc.

The thermoplastic resin composition of the present invention can be obtained by mixing the respective components with suitable means such as various types of extruder, Banbury mixer, kneader, roll mill, feederrooder etc. A method using an extruder or Banbury mixer is preferred. Mixing of the components can be effected either by adding them all at one time or by adding them in several portions. The components may be mixed by a multi-stage addition system with an extruder or may be mixed by a Banbury mixer, kneader or other means and then pelletized by an extruder.

The thermoplastic resin composition according to the present invention can be molded into a variety of articles by known molding methods such as injection molding, sheet forming, extrusion molding, vacuum molding, profile molding, foam molding, injection pressing, press molding, blow molding, etc., but sheet forming is especially suited for obtaining a molded article with excellent matte effect. When sheet forming the thermoplastic resin composition according to the present invention, melt flow rate is usually 0.5 to 10 g/10 min, preferably 1 to 8 g/10 min.

The molded articles obtained by using the thermoplastic resin composition of the present invention have no nonuniformity of matting on the surface, and glossiness of the surface is usually not more than 20%, preferably not more than 18%, more preferably not more than 16%.

According to the present invention, as described above, there is provided a thermoplastic resin composition having excellent moldability and capable of providing the molded products with high mechanical strength and matte surface appearance. The thermoplastic resin composition according to the present invention is particularly useful as a molding material for the surface matted sheet-like products.

EXAMPLES

The present invention will be explained in further detail by showing the examples thereof, but the invention is not subject to any restrictions by these examples and can be embodied as well in other forms. In the following Examples and Comparative Examples, all "parts" and "percents (%)" are by weight unless otherwise noted.

<Evaluation Methods>

(1) Glass Transition Temperature

Measured by using a differential scanning calorimeter.

(2) Molecular Weight Distribution of Tetrahydrofuran-Soluble Matter of Thermoplastic Resin Composition Weight-average molecular weight (Mw) and number-average molecular weight (Mn) of the tetrahydrofuran-soluble matter of the thermoplastic resin composition were measured under the conditions shown in the following, and their ratio (Mw/Mn) was determined.

| | |
|---|---|
| Apparatus: | HPLC 8020 Series (Tohsoh Co., Ltd.) |
| Columns: | TSK Gel G5000HHR and G3000HHR |
| Eluent: | THF |
| Detector: | Differential refractometer |
| Pre-treatment: | 0.02 g of the specimen was dissolved in 10 ml of eluent and passed through a 0.45 μm filter. |
| Calculation of molecular weight: | Standard polystyrene-reduced. |

(3) Mooney Viscosity

Measured according to JIS K6300.

(4) Graft Ratio

A predetermined amount (X) of a rubber-reinforced thermoplastic resin was put into acetone and shaken by a shaker for 2 hours to obtain a solution containing insolubles. This solution was centrifuged at 23,000 rpm for 30 minutes, recovering the insoluble matter. This insoluble matter was treated by a vacuum dryer at 120 for one hour, and its weight (Y) was measured. Graft ratio was calculated from the following equation:

Graft ratio (%)=[(Y−X×rubber component ratio in rubber-reinforced thermoplastic resin)/(X×rubber component ratio in rubber-reinforced thermoplastic resin)]×100

(5) Intrinsic Viscosity [η]

The specimen was put into acetone and shaken by a shaker for 2 hours to dissolve the free copolymer. This solution was centrifuged at 23,000 rpm for 30 minutes to obtain acetone insoluble matter. This matter was heated, dried and then dissolved in methyl ethyl ketone, and intrinsic viscosity [η] of the solution was measured at 30° C.

(6) Melt Flow Rate (MFR)

Measured at 220° C. under a load of 10 kg. Unit: g/10 min.

(7) Impact Strength

A ¼×½ inch test piece molded by an injection molder (cylinder temperature: 200° C., injection/dwelling/cooling= 2/10/30 sec.) was notched and its impact strength was measured according to ASTM D-256. Unit: kg·cm/cm.

(8) Surface Gloss

A 300 mm×50 mm×1 mm thick strip sheet was made by using an extruder, and its surface gloss was measured according to ASTM D-523 (θ=60°). Unit: %.

(9) Matting Nonuniformity

A 300 mm×50 mm×1 mm thick strip sheet was made by using an extruder, and nonuniformity of matting on the sheet surface was visually judged and rated. The criterion of rating is as shown in the following.

A: No nonuniformity of matting was observed.
B: The area where nonuniformity of matting took place was less than 20%.
C: The area where nonuniformity of matting took place was 20 to 80%.
D: The area where nonuniformity of matting took place was more than 80%.

Preparation of Rubber-Reinforced Thermoplastic Resin (A1)

30 parts of rubber-like polymer (B4) shown in Table 3, 49 parts of styrene, 21 parts of acrylonitrile and 110 parts of toluene were supplied to a 20-liter stainless steel autoclave equipped with a ribbon type stirrer, a continuous auxiliary adding device and a thermometer. The internal temperature of the autoclave was raised to 75° C. and the contents of the autoclave were stirred for one hour to form a homogeneous solution. Then 0.45 part of t-butyl peroxyisopropylcarbonate was added to the solution and internal temperature was further raised to 100° C., and with this temperature maintained, the solution was stirred at 100 rpm to carry out polymerization reaction. On passage of 4 hours after start of polymerization reaction, internal temperature was raised to 120° C. and the reaction was further continued at this temperature for 2 hours. Thereafter, internal temperature was lowered to 100° C., 0.2 part of octadecyl-3-(3,5-di-t-butyl-4-hydroxyphenol)-propionate was added, and then the reaction mixture was withdrawn from the autoclave. The unreacted portions of materials and solvent were removed by steam distillation, and the product was finely pulverized and subjected to a 40 mmφ vented extruder operated at a cylinder temperature of 220° C. under a degree of vacuum of 700 mmHg (differential pressure to atmospheric pressure), thereby evaporating away the volatiles and producing a rubber-reinforced thermoplastic resin, which was then pelletized. Intrinsic viscosity [η] of acetone soluble matter of this rubber-reinforced thermoplastic resin was 0.4 dl/g, and graft ratio was 55%.

Preparation of Rubber-Reinforced Thermoplastic Resin (A2)

30 parts of a hydrogenated block copolymer (TUFTEC H1041 produced by Asahi Chemical Industry Co., Ltd.), 50 parts of methyl methacrylate, 10 parts of styrene, 10 parts of acrylonitrile and 120 parts of toluene were supplied to a 10-liter stainless steel autoclave equipped with a ribbon type stirrer. The supplied materials were dissolved by stirring to form a homogeneous solution. Then 0.5 part of t-butyl peroxyisopropylcarbonate and 0.1 part of t-dodecylmercaptan were added and the temperature was raised with stirring continued. After reaching 100° C., the temperature was controlled to stay constant and polymerization reaction was carried out at this temperature with stirring at 200 rpm.

The reaction was conducted for 6 hours. Polymerization conversion was 85%, graft ratio was 42%, and intrinsic viscosity [η] of acetone soluble matter was 0.41 dl/g. After cooling to 100° C., 0.2 part of 2,2-methylenebis-4-methyl-6-butylphenol was added and the reaction mixture was withdrawn from the autoclave. The unreacted portions of materials and solvent were removed by steam distillation and the product was finely pulverized and subjected to a 40 mmφ vacuum vented extruder (220° C., 700 mmHg (differential pressure to atmospheric pressure)), whereby the volatiles were substantially evaporated away and pellets were formed.

Ethylene-α-olefin Copolymers (B1–B4)

The ethylene-α-olefin copolymers (B1–B4) shown in Table 1 were used.

TABLE 1

|  | B1 | B2 | B3 | B4 |
|---|---|---|---|---|
| Ethylene-α-olefin copolymer composition (parts) | | | | |
| Ethylene | 73 | 55 | 78 | 62 |
| Propylene | 27 | 40 | 22 | 33 |
| Cyclopentadiene | — | — | — | 5 |
| Ethylidene norbornene | — | 5 | — | — |
| Properties of ethylene-α-olefin copolymers | | | | |
| Glass transition temperature | −53 | −50 | −50 | −60 |
| Mooney viscosity (ML1 + 4, 100° C.) | 70 | 80 | 20 | 33 |

Production and Evaluation of Thermoplastic Resin Composition

Example 1

Rubber-reinforced thermoplastic resin (A1) and ethylene-α-olefin copolymer (B1) shown in Table 1 were mixed in the form of pellets in the ratios shown in Table 2, and then using a 40 mmφ vented extruder operated at a cylinder temperature of 220° C. under a degree of vacuum of 700 mmHg (differential pressure to atmospheric pressure), the volatiles were evaporated away to obtain a thermoplastic resin composition and the composition was pelletized. The results of evaluations conducted on this composition are shown in Table 2.

Example 2

A thermoplastic resin composition was obtained in the same way as in Example 1 except that ethylene-α-olefin copolymer (B1) was replaced by (B2), and subjected to evaluations. Results are shown in Table 2.

Comparative Example 1

A thermoplastic resin composition was produced in the same way as in Example 1 except that ethylene-α-olefin copolymer (B1) was replaced by (B3). The results of evaluations are shown in Table 2.

Comparative Example 2

A thermoplastic resin composition was produced in the same way as in Example 1 except that ethylene-α-olefin copolymer (B1) was replaced by (B4). The results of evaluations are shown in Table 2.

Example 3

Rubber-reinforced thermoplastic resins (A1) and (A2) and ethylene-α-olefin copolymer (B1) were mixed in the form of pellets in the ratios shown in Table 3, and the mixture was subjected to a 40 mmφ vented extruder operated at a cylinder temperature of 220° C. under a degree of vacuum of 700 mmHg (differential pressure to atmospheric pressure) to evaporate away the volatiles to produce a thermoplastic resin composition, which was then pelletized. The results of evaluations on the composition are shown in Table 3.

Example 4

A thermoplastic resin composition was obtained in the same way as in Example 3 except that ethylene-α-olefin copolymer (B1) was replaced by (B2). The results of evaluations are shown in Table 5.

Example 5

Following the procedure of Example 3, rubber-reinforced thermoplastic resins (A1) and (A2) and ethylene-α-olefin copolymer (B2) were mixed in the form of pellets in the ratios shown in Table 3, and the mixture was subjected to a 40 mmφ vented extruder operated at a cylinder temperature of 220° C. under a degree of vacuum of 700 mmHg (differential pressure to atmospheric pressure) to evaporate away the volatiles to produce a thermoplastic resin composition, the composition being then pelletized. The results of evaluations are shown in Table 3.

Comparative Example 3

A thermoplastic resin composition was obtained in the same way as in Example 3 except that ethylene-α-olefin copolymer (B1) was replaced by (B3). The results of evaluations are shown in Table 3.

Comparative Example 4

A thermoplastic resin composition was obtained in the same way as in Example 3 except that ethylene-α-olefin copolymer (B1) was replaced by (B4). The results of evaluations are shown in Table 3.

TABLE 2

|  | Ex. 1 | Ex. 2 | Comp. Ex. 1 | Comp. Ex. 2 |
|---|---|---|---|---|
| Thermoplastic resin composition (parts) | | | | |
| Rubber-reinforced thermoplastic resin (A1) | 100 | 100 | 100 | 100 |
| Ethylene-α-olefin copolymers (B) | | | | |
| B1 | 15 | | | |
| B2 | | 15 | | |
| B3 | | | 15 | |
| B4 | | | | 15 |
| Properties of | | | | |

TABLE 2-continued

|  | Ex. 1 | Ex. 2 | Comp. Ex. 1 | Comp. Ex. 2 |
|---|---|---|---|---|
| thermoplastic resin composition |  |  |  |  |
| MFR | 7 | 6 | 15 | 14 |
| Mw THF-soluble matter | 162000 | 186000 | 120000 | 79000 |
| Mw/Mn THF-soluble matter | 3.1 | 2.8 | 2.1 | 2.9 |
| Properties of molded product |  |  |  |  |
| Impact strength | 56 | 60 | 25 | 28 |
| Surface gloss (60°) | 16 | 14 | 57 | 54 |
| Nonuniformity of matting | A | A | D | C |

TABLE 3

|  | Ex. 3 | Ex. 4 | Ex. 5 | Comp. Ex. 3 | Comp. Ex. 4 |
|---|---|---|---|---|---|
| Thermoplastic resin composition (parts) |  |  |  |  |  |
| Rubber-reinforced thermoplastic resin (A1) | 100 | 100 | 100 | 100 | 100 |
| Rubber-reinforced thermoplastic resin (A2) | 25 | 25 | 25 | 25 | — |
| Ethylene-α-olefin copolymers (B) |  |  |  |  |  |
| B1 | 12.5 |  |  |  |  |
| B2 |  | 12.5 |  |  |  |
| B3 |  |  | 18.5 |  |  |
| B4 |  |  |  | 12.5 |  |
| B4 |  |  |  |  | 12.5 |
| Properties of thermoplastic resin composition |  |  |  |  |  |
| MFR | 14 | 13 | 10 | 17 | 18 |
| Mw THF-soluble matter | 110000 | 125000 | 137000 | 87000 | 75000 |
| Mw/Mn THF-soluble matter | 3.2 | 3.1 | 2.9 | 2.6 | 3.2 |
| Properties of molded product |  |  |  |  |  |
| Impact strength | 59 | 63 | 58 | 22 | 25 |
| Surface gloss (60°) | 22 | 20 | 16 | 60 | 52 |
| Nonuniformity of matting | A | A | A | C | D |

What is claimed is:

1. A thermoplastic resin composition comprising a rubber-reinforced thermoplastic resin as component (A) and an ethylene-α-olefin copolymer having a Mooney viscosity (ML1+4, 100° C.) of 40 to 110 as component (B), the amount of component (B) being 1 to 70 parts by weight based on 100 parts by weight of component (A).

2. A thermoplastic resin composition according to claim 1, wherein the component (A) is a rubber-reinforced thermoplastic resin (A1) obtained by polymerizing 5 to 94% by weight of an aromatic vinyl compound, 1 to 90% by weight of a vinyl cyanide compound and 0 to 89% by weight of other copolymerizable compound (the total of the ratios of the respective components being 100% by weight) in the presence of 5 to 80% by weight of a rubber-like polymer (i) which is an ethylene-α-olefin-(nonconjugated diene) copolymer.

3. A thermoplastic resin composition according to claim 2, wherein the component (A) comprises 100 parts by weight of said rubber-reinforced thermoplastic resin (A1) and 1 to 70 parts by weight of a rubber-reinforced thermoplastic resin (A2) obtained by polymerizing 5 to 94% by weight of an aromatic vinyl compound, 1 to 90% by weight of a vinyl cyanide compound and 0 to 89% by weight of other copolymerizable compound (the total of the ratios of the respective components being 100% by weight) in the presence of 5 to 80% by weight of a rubber-like polymer (ii),
   which rubber-like polymer (ii) is a hydrogenated block copolymer obtained by hydrogenating a block copolymer comprising an aromatic vinyl compound unit and a conjugated diene compound unit, the number-average molecular weight (Mn) of the block copolymer being 5,000 to 1,000,000, the ratio of weight-average molecular weight (Mw) to number-average molecular weight (Mn), Mw/Mn, being not more than 10, the vinyl bond content of the diene moiety being 10 to 90%, and the hydrogenation rate of the olefinic unsaturated bond is not less than 70%.

4. A thermoplastic resin composition according to claim 1 wherein the weight-average molecular weight (Mw) of the tetrahydrofuran-soluble matter of the thermoplastic resin composition comprising is not less than 100,000, and the ratio of weight-average molecular weight (Mw) to number-average molecular weight (Mn) of said soluble matter, Mw/Mn, is not less than 2.5.

5. A thermoplastic resin composition according to claim 2 wherein the weight-average molecular weight (Mw) of the tetrahydrofuran-soluble matter of the thermoplastic resin composition comprising is not less than 100,000, and the ratio of weight-average molecular weight (Mw) to number-average molecular weight (Mn) of said soluble matter, Mw/Mn, is not less than 2.5.

6. A thermoplastic resin composition comprising a rubber-reinforced thermoplastic resin as component (A) and an ethylene-α-olefin copolymer having a Mooney viscosity (ML1+4, 100° C.) of 40 to 110 as component (B), the amount of component (B) being 1 to 70 parts by weight based on 100 parts by weight of component (A),
   said component (A) comprising:
      100 parts by weight of a rubber-reinforced thermoplastic resin (A1) obtained by polymerizing 5 to 94% by weight of an aromatic vinyl compound, 1 to 90% by weight of a vinyl cyanide compound and 0 to 89% by weight of other copolymerizable compound (the total of the ratios of the respective components being 100% by weight) in the presence of 5 to 80% by weight of a rubber-like polymer (i) which is an ethylene-α-olefin-(nonconjugated diene) copolymer, and
      1 to 70 parts by weight of a rubber-reinforced thermoplastic resin (A2) obtained by polymerizing 5 to 94% by weight of an aromatic vinyl compound, 1 to 90% by weight of a vinyl cyanide compound and 0 to 89% by weight of other copolymerizable compound (the total of the ratios of the respective components being 100% by weight) in the presence of 5 to 80% by weight of a rubber-like polymer (ii),
   which rubber-like polymer (ii) is a hydrogenated block copolymer obtained by hydrogenating a block copolymer comprising an aromatic vinyl compound unit and a conjugated diene compound unit, the number-average molecular weight (Mn) of the block copolymer being 5,000 to 1,000,000, the ratio of weight-average molecular weight (Mw) to number-average molecular weight (Mn), Mw/Mn, being not more than 10, the vinyl bond content of the diene moiety being 10 to 90%, and the hydrogenation rate of the olefinic unsaturated bond is not less than 70%.

* * * * *